United States Patent
Chang

(10) Patent No.: US 8,190,756 B2
(45) Date of Patent: May 29, 2012

(54) METHOD FOR AUTOMATICALLY RE-CONNECTING CUSTOMER PREMISES EQUIPMENT (CPE) WEB USER INTERFACE (UI)

(75) Inventor: Wei-Kang Chang, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 277 days.

(21) Appl. No.: 12/336,644

(22) Filed: Dec. 17, 2008

(65) Prior Publication Data

US 2010/0049840 A1 Feb. 25, 2010

(30) Foreign Application Priority Data

Aug. 19, 2008 (TW) ................ 97131597 A

(51) Int. Cl.
*G06F 11/00* (2006.01)
*G06F 15/16* (2006.01)
*G06F 15/173* (2006.01)
*G06F 3/00* (2006.01)
*G06F 3/048* (2006.01)
*H04L 12/28* (2006.01)
*H04L 5/16* (2006.01)
*G05B 15/00* (2006.01)
*G06Q 30/00* (2006.01)

(52) U.S. Cl. ............... 709/229; 700/1; 705/15; 705/37; 709/203; 709/217; 709/218; 709/223; 709/224; 709/225; 709/233; 710/52; 715/768; 715/771

(58) Field of Classification Search .................. None
See application file for complete search history.

(56) References Cited

U.S. PATENT DOCUMENTS

| | | | | |
|---|---|---|---|---|
| 5,930,527 A * | 7/1999 | Shin | | 710/72 |
| 6,453,024 B1 * | 9/2002 | Baker et al. | | 379/93.29 |
| 6,789,257 B1 * | 9/2004 | MacPhail | | 719/316 |
| 6,823,479 B1 * | 11/2004 | McElhaney et al. | | 714/43 |
| 7,035,921 B1 * | 4/2006 | Baker | | 709/224 |
| 7,290,046 B1 * | 10/2007 | Kumar | | 709/223 |
| 2002/0019751 A1 * | 2/2002 | Rothschild et al. | | 705/3 |
| 2003/0033382 A1 * | 2/2003 | Bogolea et al. | | 709/218 |
| 2004/0107267 A1 * | 6/2004 | Donker et al. | | 709/218 |
| 2005/0076111 A1 * | 4/2005 | Cherkasova et al. | | 709/224 |
| 2005/0181734 A1 * | 8/2005 | Coutts et al. | | 455/67.16 |
| 2006/0013236 A1 * | 1/2006 | Fischer | | 370/401 |
| 2006/0067237 A1 * | 3/2006 | Burns et al. | | 370/241 |
| 2006/0126706 A1 * | 6/2006 | Brand et al. | | 375/222 |
| 2006/0271707 A1 * | 11/2006 | Cheline et al. | | 709/245 |
| 2007/0055760 A1 * | 3/2007 | McCoy et al. | | 709/223 |
| 2007/0111568 A1 * | 5/2007 | Ferrari et al. | | 439/131 |
| 2007/0293951 A1 * | 12/2007 | Takahashi et al. | | 700/1 |
| 2007/0299965 A1 * | 12/2007 | Nieh et al. | | 709/224 |
| 2008/0005247 A9 * | 1/2008 | Khoo | | 709/206 |

(Continued)

*Primary Examiner* — Moustafa M Meky
*Assistant Examiner* — Ho Shiu
(74) *Attorney, Agent, or Firm* — WPAT., P.C.; Justin King

(57) ABSTRACT

The present invention relates to a method for automatically re-connecting customer premises equipment (CPE) web user interfaces (UIs), capable of continuously sending a login request to a HTTP server to reduce the time for the user to wait, the method comprising: inserting a frame into a web page in a system to be re-connected and logged in; requesting a HTTP server to send a new web page through the frame after a customer premises equipment (CPE) completes software update and receives a response requesting the system to reboot; issuing a re-login request if the new web page is received, indicating the HTTP server has been started up and a new connection is made; and logging in the system.

5 Claims, 3 Drawing Sheets

U.S. PATENT DOCUMENTS

| | | | |
|---|---|---|---|
| 2008/0057958 A1* | 3/2008 | Bennett | 455/435.1 |
| 2008/0077704 A1* | 3/2008 | Shah et al. | 709/233 |
| 2008/0104165 A1* | 5/2008 | Lo et al. | 709/203 |
| 2008/0177859 A1* | 7/2008 | Nickerson | 709/217 |
| 2008/0250169 A1* | 10/2008 | Coca et al. | 710/52 |
| 2008/0285483 A1* | 11/2008 | Gil et al. | 370/254 |
| 2009/0037314 A1* | 2/2009 | Powell et al. | 705/37 |
| 2009/0235067 A1* | 9/2009 | Miller et al. | 713/151 |
| 2009/0271780 A1* | 10/2009 | B. et al. | 717/173 |
| 2009/0327116 A1* | 12/2009 | Cunningham et al. | 705/37 |

* cited by examiner

METHOD FOR AUTOMATICALLY RE-CONNECTING CUSTOMER PREMISES EQUIPMENT (CPE) WEB USER INTERFACE (UI)

BACKGROUND OF THE INVENTION

1. Field of the Invention

The present invention generally relates to a method for automatically re-connecting a customer premises equipment (CPE) web user interface (UI) and, more particularly, to a method capable of automatically connecting to the HTTP server during CPE software update to reduce the time for the user to wait.

2. Description of the Prior Art

With the rapid development in computers and the Internet, the popularity in computer networks has made network equipments important. Generally, these network equipments include hubs, bridges, switches, routers, gateways, repeaters, etc., which are the so-called customer premises equipments (CPEs).

The fast development in software and hardware makes it possible to update from time to time, such as firmware update and system recovery. Especially, CPE firmware update and software update are performed through the Internet.

Please refer to FIG. 1, which shows a flowchart of a conventional procedure of system login after CPE software update. In FIG. 1, a user 10 issues a system reboot request 12 through a browser 11 after software update. The system reboot request 12 can be sent to a HTTP server 13 through a medium (such as the Internet). The HTTP server 13 sends a computer reboot request 14 to a computer 15 to request the computer 15 to reboot after the HTTP server 13 receives the system reboot request 12. The computer 15 executes a reboot function 16 after it receives the computer reboot request 14. The computer 15 starts up the HTTP server 17 after the reboot function 16 is executed. Thus, the user has to wait a long time 18 to know whether the HTTP server 13 has been started up, and then issues a re-connecting and login request 19 through the browser 11 to login the system after the HTTP server 13 responds 20 to the re-connecting and login request 19.

According to FIG. 1, the conventional method is characterized in that the user uses the CPE to reboot through the browser on the web user interface (UI). Since the computer is rebooted to cause disconnection on the web user interface, it takes a period of time (that is predicted) for the user to re-connect the HTTP server through the web user interface to further login the system. However, these are several drawbacks such as:

1. Since the re-connecting time is predicted, a possibly longest booting time will be considered for such re-connecting time. However, if the booting time is not necessarily that long, there will be a waste of user's time to wait.

2. The booting time depends on the hardware and/or software system architecture, and therefore, it requires a customized web user interface for different time to wait.

3. When the CPE booting time is too long, it may require manual re-connecting after failure in connecting.

Therefore, there exists a need in providing a method for automatically re-connecting a customer premises equipment (CPE) web user interface (UI) capable of automatically connecting to the HTTP server during CPE software update to reduce the time for the user to wait.

SUMMARY OF THE INVENTION

It is one object of the present invention to provide a method for automatically re-connecting a CPE web user interface capable of automatically connecting to the HTTP server during CPE software update to reduce the time for the user to wait and prevent the failure in connecting to the HTTP server due to a request under uncompleted booting when the CPE booting time is too long.

The present invention provides a method of automatically re-connecting CPE web user interface. In the method, as the CPE uses a web user interface (web UI) to reboot, a frame is inserted into a web page in a system to be re-connected and logged in. An HTTP server is requested to send a new web page through the frame after a CPE completes software update and receives a response. The HTTP server has not been started up yet and there is a duration of time to wait to re-request the HTTP server if the HTTP server failed to send the new web page, wherein the duration of time to wait is determined by the user, for example, to be 1 second. As the new web page is received, the HTTP server has been started up and the user re-logs in the system so that the time to wait is reduced. Moreover, there is no need to develop customized web page corresponding to different software/hardware configurations. Also, failure in web page re-login can be prevented.

The method for automatically re-connecting a customer premises equipment web user interface according to the present invention comprises steps of: inserting a frame into a web page in a system to be re-connected and logged in; requesting a HTTP server to send a new web page through the frame after a customer premises equipment (CPE) completes software update and receives a response requesting the system to reboot; issuing a re-login request if the new web page is received, indicating the HTTP server has been started up and a new connection is made; and logging in the system.

In the present invention, the method for automatically re-connecting a customer premises equipment web user interface exhibits the following advantages:

For the developers, there is no need to develop to design customized web pages corresponding to different CPE's and to estimate the rebooting time of the CPE's.

For the users, the time to wait is reduced and also the possibility in failure in re-connection due to short duration of time to wait is lowered.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by the preferred embodiment as described hereinafter.

Figure 1:
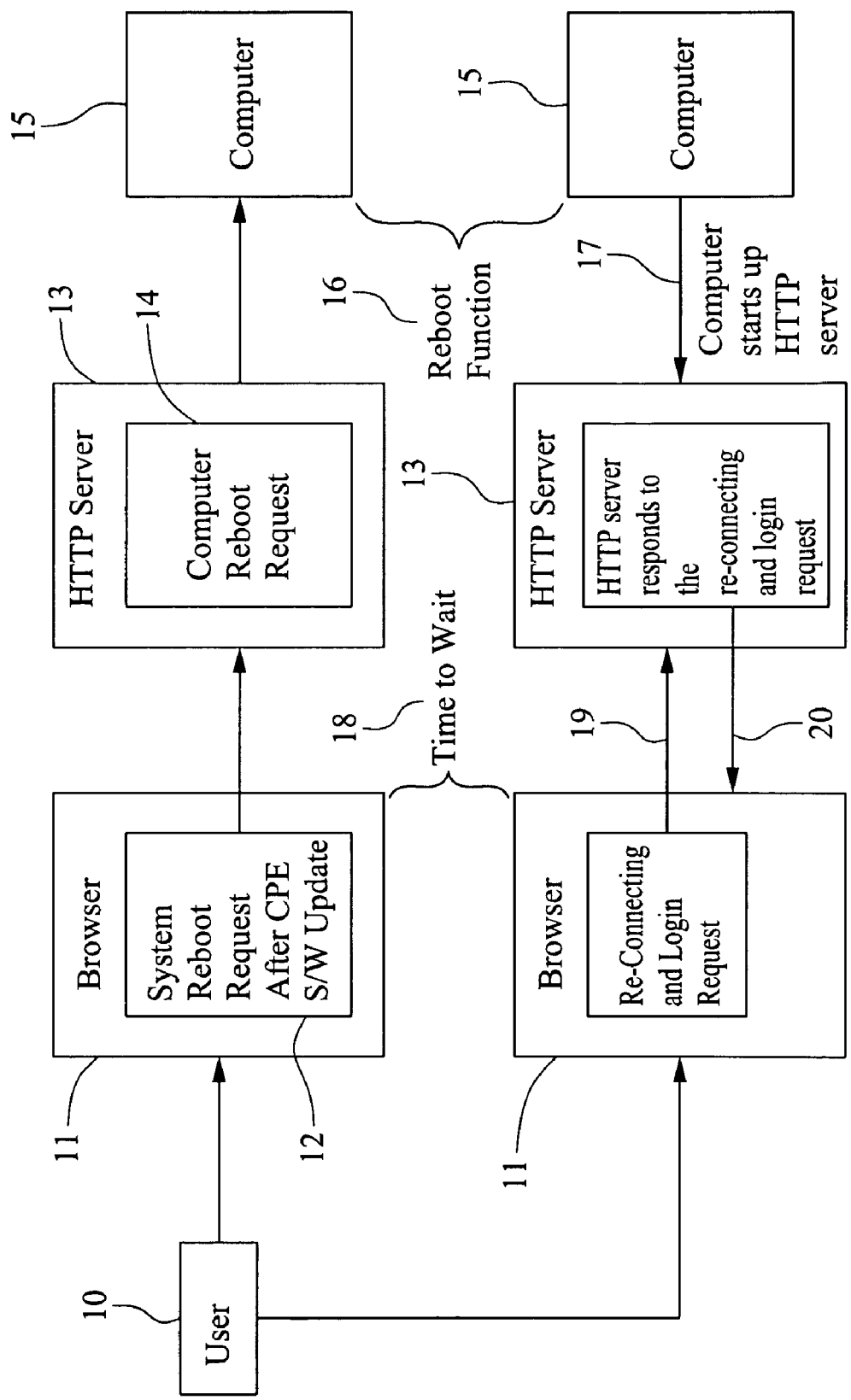
FIG. 1 shows a flowchart of a conventional system login procedure after CPE software update.
Figure 2:
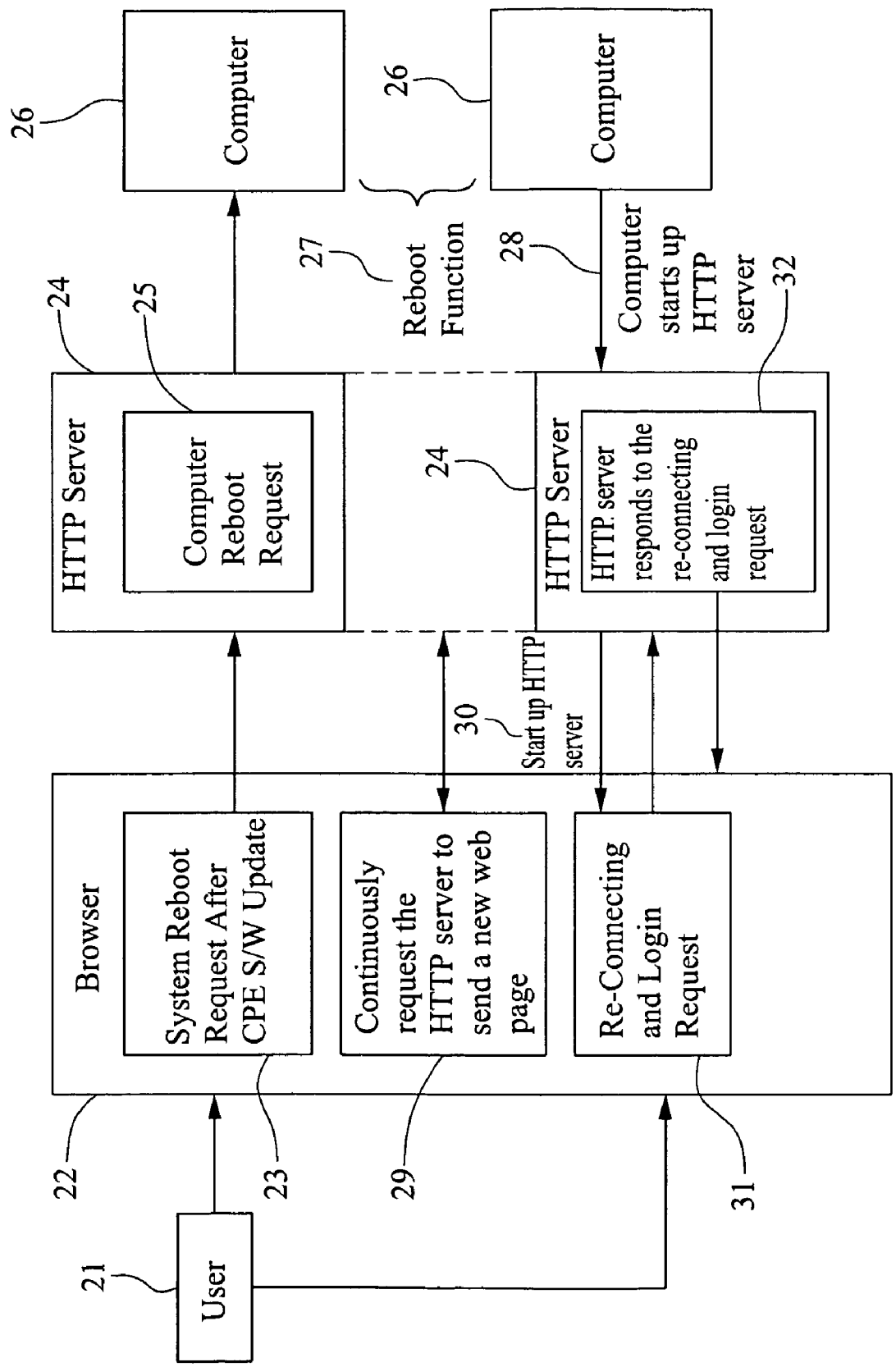
FIG. 2 shows a flowchart of a system login procedure after CPE software update according to the present invention.

Please refer to FIG. 2, which shows a flowchart of a system login procedure after CPE software update according to the present invention. Referring to FIG. 2, in the method according to the present invention, when a user 21 issues a system reboot request 23 through a browser 22 after software update, the system reboot request 23 can be sent to a HTTP server 24 through a medium (such as the Internet). The HTTP server 24 sends a computer reboot request 25 to a computer 26 to request the computer 26 to reboot after the HTTP server 24 receives the system reboot request 23. The computer 26 executes a reboot function 27 after it receives the computer reboot request 25. The computer 26 executes the reboot function 27 after it receives the computer reboot request 25. The computer 26 sends a HTTP server start-up signal 28 to the HTTP server 24 after the computer 26 has booted. The HTTP server 24 executes a HTTP server start-up process after the HTTP server 24 receives the HTTP server start-up signal 28. A signal 30 indicating the HTTP server has been started up is sent to the browser 22 after the HTTP server 24 has been started up. More particularly, the present invention is characterized in that a frame is inserted into a web page in a system to be re-connected when the browser 22 issues the system reboot request 23 to the HTTP server 24 after software update. The HTTP server 24 is requested by the frame to send a new web page 29 through the browser 22. Since the frame continuously requests the HTTP server 24 to send back a new web page 29, the HTTP server will immediately send the new web page once the HTTP server 24 has been started up. Meanwhile, the user is acknowledged that the HTTP server 24 has been started up to issue a re-connecting and login request 31. As the HTTP server responds to the re-connecting and login request (32), the user can log in the system so as to significantly reduce the time to wait for system re-login.

It should be easily understood from the preferred embodiment of the present invention that the method for automatically re-connecting a customer premises equipment web user interface exhibits the following advantages:

For the developers, there is no need to develop to design customized web pages corresponding to different CPE's and to estimate the rebooting time of the CPE's. For the users, the time to wait is reduced and also the possibility in failure in re-connection due to short duration of time to wait is lowered.

Figure 3:
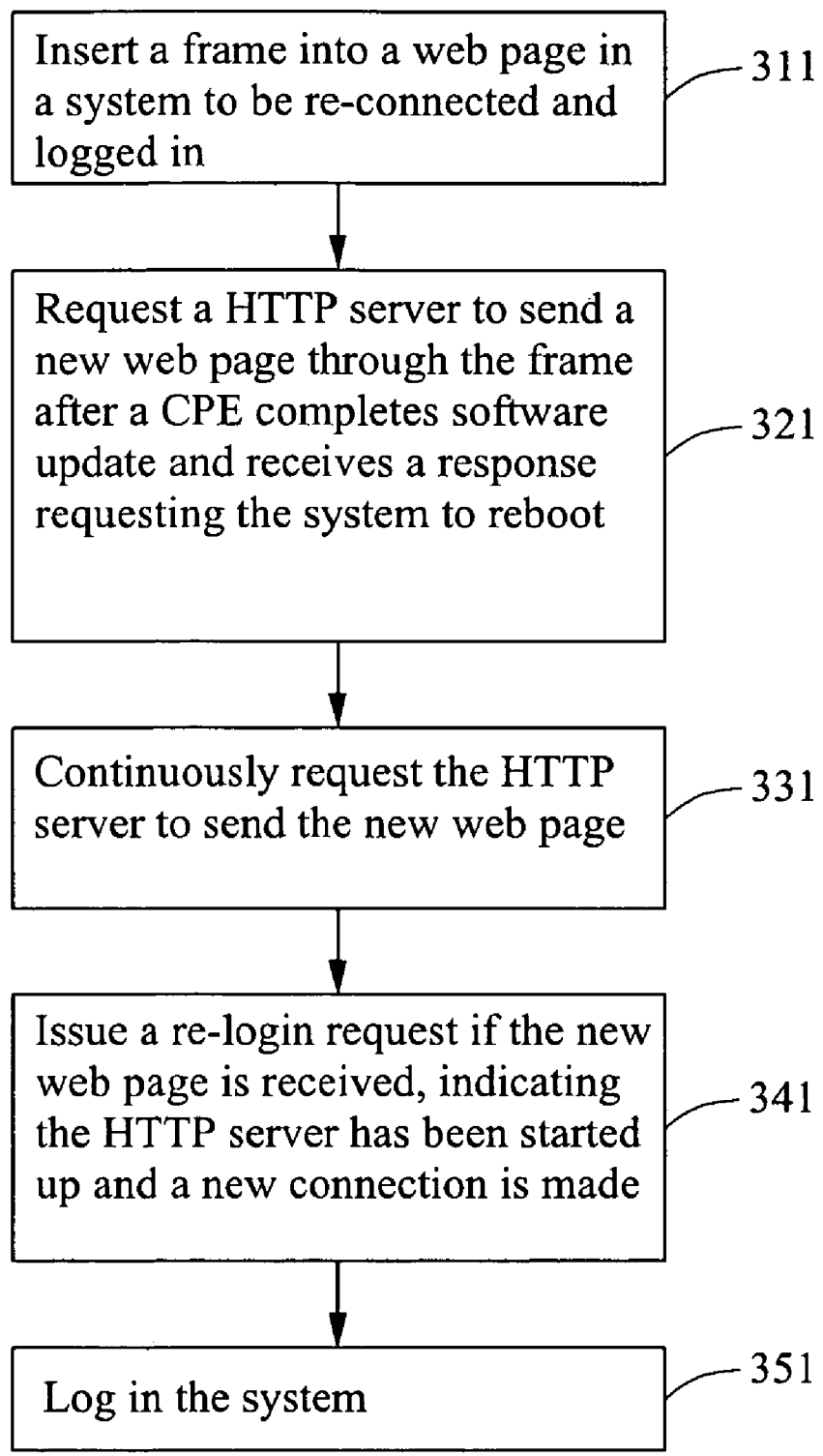
FIG. 3 shows a flowchart of a method for automatically re-connecting a customer premises equipment (CPE) web user interface (UI) according to the present invention.

Please refer to FIG. 3, which shows a flowchart of a method for automatically re-connecting a customer premises equipment (CPE) web user interface (UI) according to the present invention. In FIG. 3, the method for automatically re-connecting a customer premises equipment (CPE) web user interface (UI) during CPE software update comprises at least steps of:

Step 311: a frame is inserted into a web page in a system to be re-connected and logged in.

Step 321: a HTTP server is requested to send a new web page through the frame after a CPE completes software update and receives a response.

Step 331: the HTTP server is continuously requested to send the new web page.

Step 341: a re-login request is issued if the new web page is received, indicating the HTTP server has been started up and a new connection is made.

Step 351: the system is logged in.

Accordingly, the present invention provides a method for automatically re-connecting a customer premises equipment (CPE) web user interface (UI), capable of automatically connecting to the HTTP server during CPE software update to reduce the time for the user to wait and prevent the failure in connecting to the HTTP server due to a request under uncompleted booting when the CPE booting time is too long. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for automatically re-connecting a customer premises equipment (CPE) web user interface (UI) during CPE software update, the method comprising at least steps of:
   a) inserting a frame into a web page in a system to be re-connected and logged in;
   b) requesting a HTTP server to send a new web page through the frame after a CPE completes software update and receives a response requesting the system to reboot;
   c) continuously requesting the HTTP server to send the new web page;
   d) issuing a re-login request if the new web page is received, indicating the HTTP server has been started up and a new connection is made; and
   e) logging in the system.

2. The method for automatically re-connecting a customer premises equipment (CPE) web user interface (UI) as recited in claim 1, wherein the step b) further comprises steps of:
   b1) issuing a system reboot request from a browser after software update, the system reboot request being sent through the Internet to the HTTP server;
   b2) sending a computer reboot request to a computer after the HTTP server receives the system reboot request so as to request the computer to reboot; and
   b3) executing a reboot function after the computer receives the computer reboot request.

3. The method for automatically re-connecting a customer premises equipment (CPE) web user interface (UI) as recited in claim 2, further comprising steps of:
   b4) starting up the HTTP server after the computer completes the reboot function; and
   b5) re-connecting the HTTP server.

4. The method for automatically re-connecting a customer premises equipment (CPE) web user interface (UI) as recited in claim 1, wherein the step c) further comprises a step of: requesting the HTTP server from the frame to send the new web page, which results in that the HTTP server has not been started up yet and there is a duration of time to wait to re-request the HTTP server if the HTTP server failed to send the new web page, wherein the duration of time to wait is determined by a user of the CPE.

5. The method for automatically re-connecting a customer premises equipment (CPE) web user interface (UI) as recited in claim 4, wherein the frame requests the HTTP server to send the new web page through a browser.

* * * * *